(12) United States Patent
Fujimori et al.

(10) Patent No.: US 8,211,523 B2
(45) Date of Patent: Jul. 3, 2012

(54) VACUUM THERMAL INSULATING MATERIAL AND METHOD OF MANUFACTURING THE SAME, AND THERMAL INSULATING BOX HAVING THE VACUUM THERMAL INSULATING MATERIAL

(75) Inventors: Yosuke Fujimori, Chiyoda-ku (JP);
Hideaki Nakano, Chiyoda-ku (JP);
Nobuo Yamamoto, Chiyoda-ku (JP);
Syohei Abiko, Chiyoda-ku (JP);
Takayuki Hanaki, Chiyoda-ku (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 0 days.

(21) Appl. No.: 13/127,596

(22) PCT Filed: Jan. 29, 2010

(86) PCT No.: PCT/JP2010/000528
§ 371 (c)(1),
(2), (4) Date: May 4, 2011

(87) PCT Pub. No.: WO2010/116583
PCT Pub. Date: Oct. 14, 2010

(65) Prior Publication Data
US 2011/0206876 A1    Aug. 25, 2011

(30) Foreign Application Priority Data

Mar. 30, 2009   (JP) ................................. 2009-081694

(51) Int. Cl.
*F16L 59/065*   (2006.01)

(52) U.S. Cl. .......................................................... 428/69
(58) Field of Classification Search ................... 428/69, 428/76; 53/430
See application file for complete search history.

(56) References Cited

U.S. PATENT DOCUMENTS 3,537,226 A * 11/1970 Le Van et al. ................... 53/430

FOREIGN PATENT DOCUMENTS

| JP | 60-091427 U | 6/1985 |
| JP | 62-204093 A | 9/1987 |
| JP | 8-028776 A | 2/1996 |
| JP | 3656028 B2 | 6/2005 |

(Continued)

OTHER PUBLICATIONS

International Search Report (PCT/ISA/210) issued on Mar. 2, 2010, by Japanese Patent Office as the International Searching Authority for International Application No. PCT/JP2010/00528.

(Continued)

*Primary Examiner* — Alexander Thomas
(74) *Attorney, Agent, or Firm* — Buchanan Ingersoll & Rooney PC (57) ABSTRACT

In a vacuum thermal insulating material having a core material enclosed in a gas barrier container whose inside is made to be a decompressed state, the core material has a lamination structure in which a plurality of sheet-shaped long fiber organic fibrous assemblies are continuously wound up from an inner periphery to an outer periphery. Then, a plurality of sheet-shaped organic fibrous assemblies are arranged in parallel and sheet-shaped multiple organic fibrous assemblies having joint sections are formed. The joint sections are made not to overlap with the upper and lower of joint sections.

12 Claims, 8 Drawing Sheets

FOREIGN PATENT DOCUMENTS

| | | |
|---|---|---|
| JP | 2005-344870 A | 12/2005 |
| JP | 2006-112440 A | 4/2006 |
| JP | 2006-283817 A | 10/2006 |
| JP | 4012903 B2 | 11/2007 |
| JP | 2008-185220 A | 8/2008 |
| JP | 2009-041592 A | 2/2009 |

OTHER PUBLICATIONS

Written Opinion (PCT/ISA/237) issued on Mar. 2, 2010, by Japanese Patent Office as the International Searching Authority for International Application No. PCT/JP2010/00528.

* cited by examiner

VACUUM THERMAL INSULATING MATERIAL AND METHOD OF MANUFACTURING THE SAME, AND THERMAL INSULATING BOX HAVING THE VACUUM THERMAL INSULATING MATERIAL

TECHNICAL FIELD

The present invention relates to a vacuum thermal insulating material and a method of manufacturing the same, and a thermal insulating box having this vacuum thermal insulating material, and more particularly to the vacuum thermal insulating material preferably used for cold heat equipment and the method of manufacturing the same, and a thermal insulating box having this vacuum thermal insulating material.

BACKGROUND ART

In recent years, from a viewpoint of prevention of global warming, power consumption reduction is required for home appliances. In particular, refrigerators take a greater portion in power consumption amount in ordinary homes and its reduction is indispensable. In order to reduce power consumption amount of refrigerators, high efficiency of a compressor and high performance of a thermal insulating material become important.

While conventionally polyurethane foam (hereinafter, referred to as PUF) had been employed as a thermal insulating material, recently a vacuum thermal insulating material having superior thermal insulating performance to PUF has come to be used in combination with PUF. Such vacuum thermal insulating material is used for cold heat equipment such as a thermal insulating container, a vehicle air-conditioner, and a water heater in addition to refrigerators.

A vacuum thermal insulator has a powder, a foam, a fiber material, or the like inserted as a core member into an enveloping member composed of an aluminum foil laminated film having a gas barrier property (air barrier properly) or the like, of which inferior is maintained at a degree of vacuum of several Pa.

Although as a core material of the vacuum thermal insulating material, powder such as silica, foam such as urethane, and fiber body such as glasses are available, the fiber body having the most superior thermal insulating performance becomes a mainstream nowadays.

There are inorganic fiber and organic filer for fiber body. There are glass fiber, carbon fiber and the like for inorganic fiber (refer to Patent Literatures 1, 4, and 6, for example). There are polystyrene fiber, polypropylene fiber, polylactate fiber, aramid fiber, LCP (liquid crystal polymer) fiber, polyethylene terephthalate fiber, polyester fiber, polyethylene fiber, cellulose fiber and the like for organic fiber (refer to Patent Literatures 2, 3, and 5, for example).

CITATION LIST

Patent Literature

Patent Literature 1 Japanese Patent Application Laid-Open Publication No. 08-028776 (pages 2-3)
Patent Literature 2 Japanese Patent No. 3656028 (page 5)
Patent Literature 3 Japanese Patent Application Laid-Open Publication No. 2006-283817 (pages 7-8)
Patent Literature 4 Japanese Patent Application Laid-Open Publication No. 2005-344870 (page 7, FIG. 2)
Patent Literature 5 Japanese Patent No. 4012903 (page 3)
Patent Literature 6 Japanese Patent Application Laid-Open Publication No. 2008-185220 (pages 4-5)

SUMMARY OF INVENTION

Technical Problem

In Patent Literatures 1 to 6, inorganic fiber such as glass fiber and organic fiber such as polyester are used as a core material for a vacuum thermal insulating material. When producing such a vacuum thermal insulating material, the core material is cut out from a core material original fabric which is usually larger than a desired size and utilized. However, since the required size differs according to a location where the vacuum thermal insulating material is disposed, restrictions are imposed on the size of the vacuum thermal insulating material due to the size of the core material original fabric or when being used with cutting off an end portion of the original fabric, the relevant portion becomes useless.

In recent years, glass fiber is mainly in use for the core material of the vacuum thermal insulating material. Although the fag end of the glass fiber core material can be reused as the core material after re-melted and spun, but since melting temperature of glass is high, significant amount of energy is needed.

On the other hand, there are core materials using thermoplastic resin fiber such as polyester. Their fag ends can be reused as the core material by being remelted, re-pelletized, and subjected to spinning. However, since physicality is lowered by thermal history at the time of re-pelletizing and spinning, when recycling rate increases, spinning property is significantly lowered to deteriorate product quality.

Therefore, a technique is proposed in Patent Literature 6 that provides a vacuum thermal insulating material which has high thermal insulating property and strength white achieving effective use of resources by utilizing waste core materials and strip waste materials of inorganic fiber such as glass fiber. However, when using the waste core materials, a complicated process is required such that after the waste core material is crushed, a boric-acid water solution is made to impregnate and dehydrated and then compression processing is performed so that fibers are oriented horizontally. When using the strip waste materials as well, a process becomes necessary such that end piece materials are separated and re-arranged, and moreover since glass fiber is hard and brittle, mineral dusts may be scattered and attached on skin or mucous membrane of an operator at the time of manufacturing, which may cause stimulation. Therefore, handling property and workability are problematic.

The present invention is made to solve the problems above and has an object to provide a vacuum thermal insulating material that can meet required sizes of the vacuum thermal insulating material using a long fiber organic fibrous assembly as a core material without generating end piece materials and that is excellent in handling property, thermal insulating performance, and productivity, a method of manufacturing the same, and a thermal insulating box having the vacuum thermal insulating material.

Solution to Problem

The vacuum thermal insulating material according to the present invention has a core material enclosed in a gas barrier container whose inside is made to be a decompressed condition and the core material is made to be a laminated structure, in which a sheet-shaped fibrous assembly is continuously wound from an inner periphery to an outer periphery.

The method of manufacturing the vacuum thermal insulating material according to the present invention is such that: a plurality of separate rolls made of a fibrous assembly is provided in parallel in an axial direction to form an aggregated roil; several sets of the aggregated rolls are arranged in an orthogonal direction to the axial direction and joints of the aggregated roll are shifted in the axial direction so that the joints do not overlap; the fibrous assemblies of each separate roll are wound all together into a winding frame provided almost in parallel with the axial direction of the aggregated roil to form a core material 1, and the core material is enclosed in the outer packaging material and decompressed.

The thermal insulating box according to the present invention is provided with an outer box and an inner box arranged inside of the outer box, and the vacuum thermal insulating material is arranged between the outer box and the inner box.

Advantageous Effects of Invention

According to the present invention, a vacuum thermal insulating material having excellent handling property, thermal insulating performance, and productivity can be obtained while achieving effective utilization of resources.

In addition, a thermal insulating box having excellent thermal insulating property can be obtained.

BRIEF DESCRIPTION OF DRAWINGS

FIGS. 5 a-d are an illustrative drawings showing a method of manufacturing the core material of FIG. 4.

DESCRIPTION OF EMBODIMENTS

Embodiment 1

Vacuum Thermal Insulating Material

Figure 1:
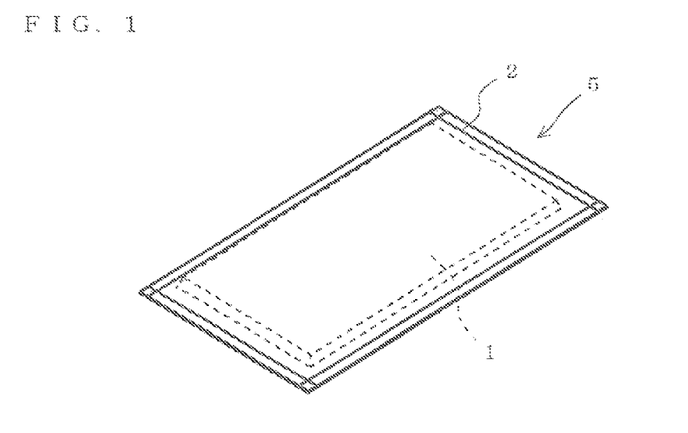
FIG. 1 is a perspective view of a vacuum thermal insulating material according to Embodiment 1 of the present invention.
Figure 2:
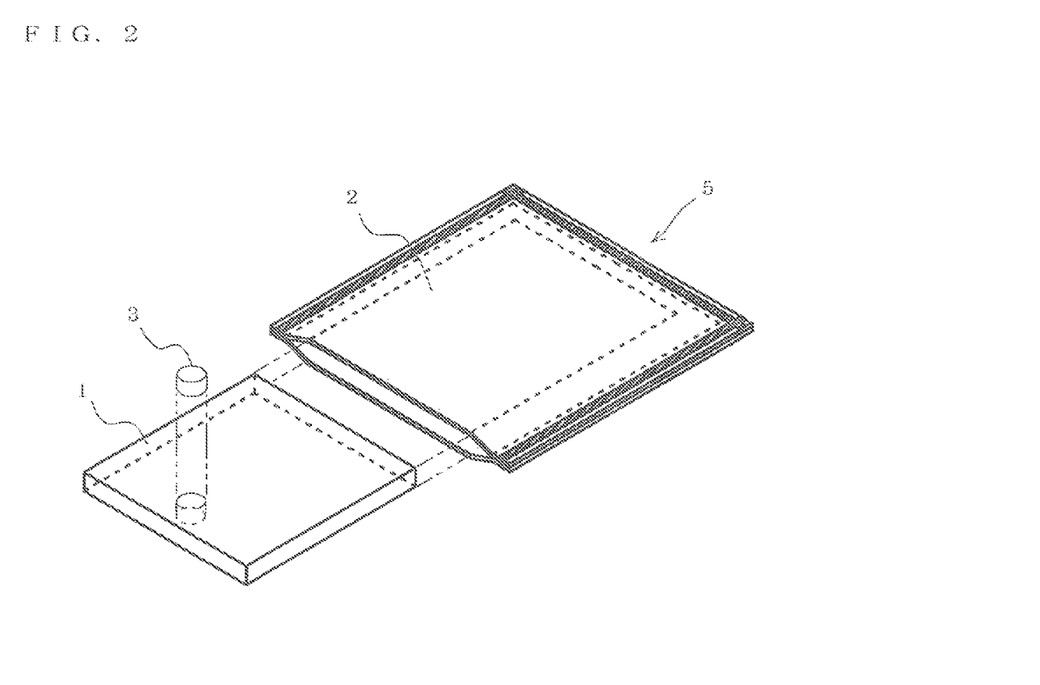
FIG. 2 is an exploded perspective view of FIG. 1.

A vacuum thermal insulating material 5 according to Embodiment 1 of the present invention has a gas-barrier property container 2 (hereinafter, referred to as an outer packaging material) having air shut-off performance and a core material 1 and a gas absorbent 3 enclosed in the outer packaging material 2 as shown in FIGS. 1 and 2. The inside of the outer packaging material 2 is decompressed at a predetermined degree of vacuum.

The outer packaging material 2 of the vacuum thermal insulating material 5 is made of a plastic laminated trim having a gas harrier property and constituted by nylon, aluminum-evaporated PET, aluminum foil, and high-density polyethylene.

Figure 3:
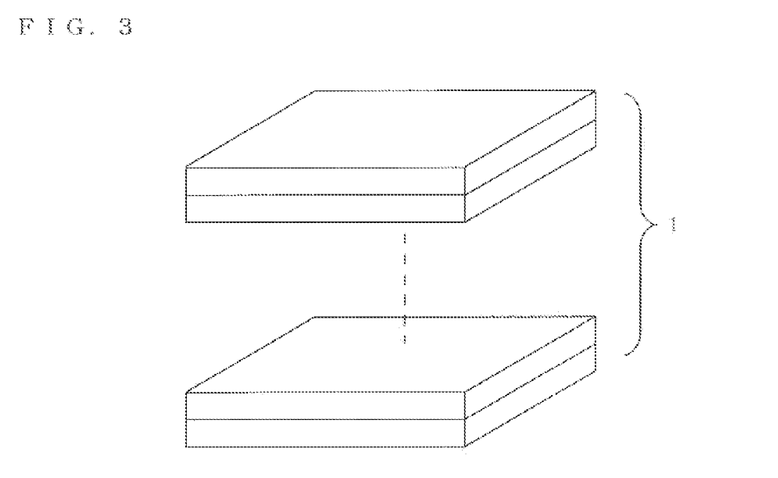
FIG. 3 is an illustrative drawing showing lamination conditions of a core material of the vacuum thermal insulating material of FIG. 1.

The core material 1 enclosed in the outer packaging material 2 is as shown in FIG. 3, a plurality of laminated sheet-shaped (band-shaped) fibrous assembly (unwoven cloth), which is a long-fiber organic fibrous assembly, for example, polyester organic unwoven cloth subjected to thermal emboss processing.

Further, adsorbent 3 is CaO that can absorb saturated water content of the organic fibrous assembly constituting the core material 1.

Detailed descriptions will be given to the configuration of the core material 1 of the vacuum thermal insulating material 5 as follows.

Figure 4:
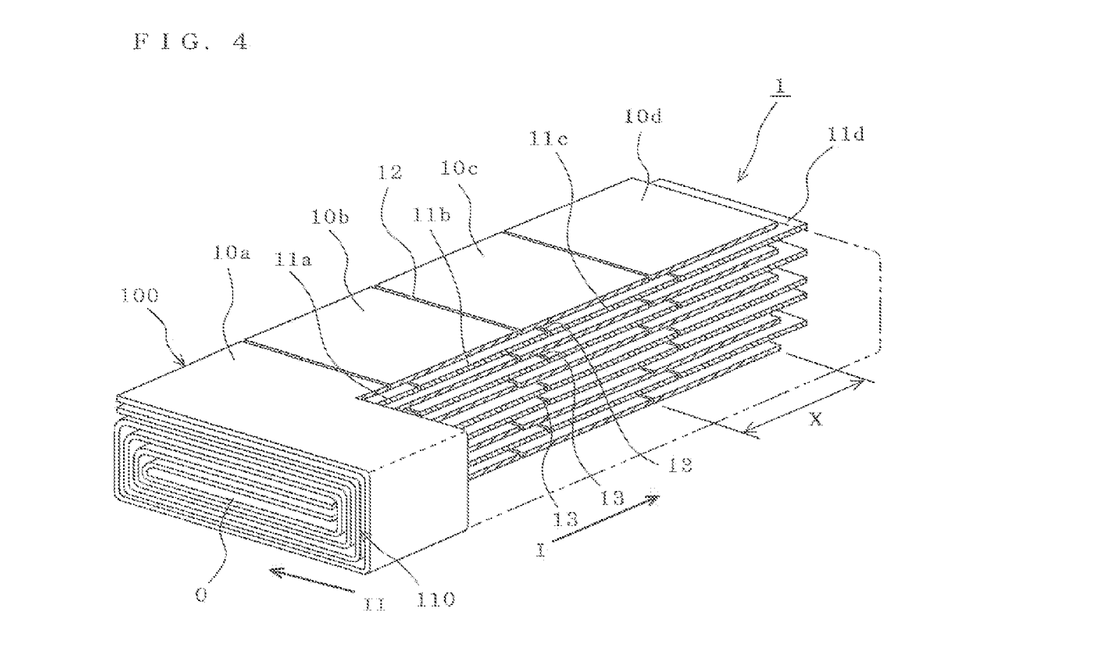
FIG. 4 is a perspective view showing part of the core material of the vacuum thermal insulating material of FIG. 1 as a cross-section.

With Embodiment 1, as shown in FIG. 4, two sheet-shaped long fiber first and second organic fibrous assemblies (hereinafter, referred to as multiple organic fibrous assemblies 100 and 110) made of plural organic fibrous assemblies 10 and 11, respectively, are wound from the inner circumference to the outer circumference in succession and laminated in a roll fashion. Thereby, organic fibrous assemblies 10 and 11 can be prevented from being separated from each other and the core material 1 having excellent strength and handling property can be obtained.

Sheet-shaped long fiber organic fibrous assemblies (or organic fiber unwoven cloths) $10a$ to $10d$ and $11a$ to $11d$ of size x smaller than the size of the width direction "I" are arranged in parallel to the width direction "I" in, for example, four to form sheet-shaped first and second multiple organic fibrous assemblies 100 and 110. The core material 1 is obtained by winding and laminating these into a roll. Then, each joint section 12 and 13 of the organic fibrous assemblies $10a$ to $10d$ and $11a$ to $11d$ constituting the first and second multiple organic fibrous assemblies 100 and 110 is alternatively shifted in the width direction "I" so as not to be vertically overlapped. In addition, in a first winding section (center section) O of the roll-shaped laminated core material 1, the joint section 13 comes to the same position because the same layer (the second multiple organic fibrous assembly 110 in Embodiment 1) is bent and opposed.

For example, in FIG. 4, although the joint sections 12 of the first multiple organic fibrous assembly 100 are vertically located in the same position and the joint sections 13 of the second multiple organic fibrous assembly 110 are vertically located in the same position, these joint sections 12 and 13 are shifted to each other alternately. However, as mentioned above, in the first winding section (center section) O, the second multiple organic fibrous assembly 110, which is the same layer, is bent and opposed while, so that the joint section 13 becomes the same position.

If joint sections 12 and 13 of the first and second multiple organic fibrous assemblies 100 and 110 are overlapped, organic fibrous assemblies 10 and 11 are separated at the joint sections 12 and 13. Therefore, the core material 1 is not united, resulting in poor handling property. That is, when the core material 1 is enclosed inside the outer packaging material 2 and decompressed to form the vacuum thermal insulating material 5, since the joint sections 12 and 13 become thin, the vacuum thermal insulating material 5 is easy to be bent, which makes it difficult to secure sufficient strength as a single sheet of the vacuum thermal insulating material 5. Accordingly, by shifting the joint sections 12 and 13 to the width direction "I" in the vertically adjoining layers, the first and second multiple organic fibrous assemblies 100 and 110 can be prevented from being shifted using the friction of the organic fibrous assemblies 10 and 11 between the joint sections 12 and 13, allowing to obtain a flat surface.

Descriptions will be given to the method of manufacturing the vacuum thermal insulating material 5 configured as the above.

Figure 5:
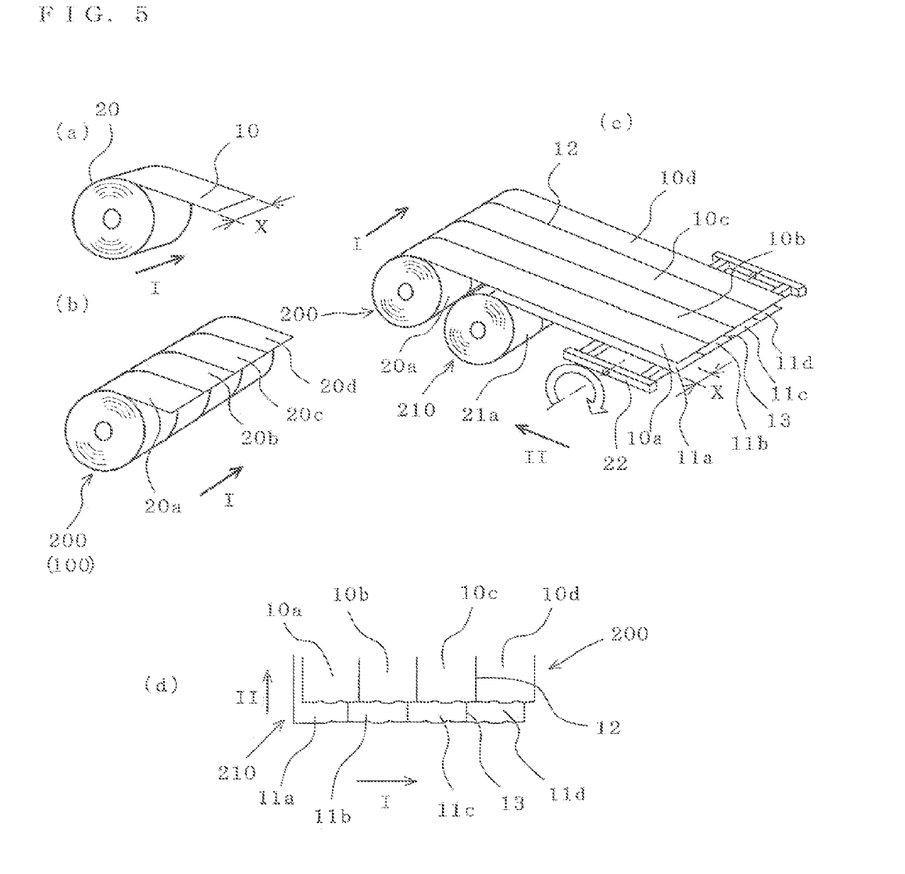
Figure 6:
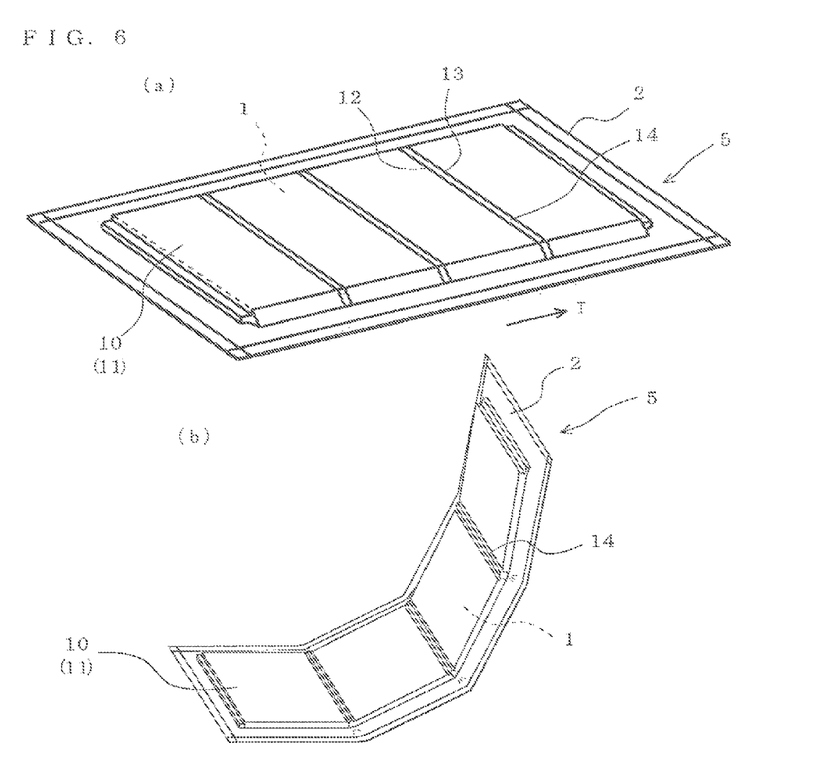
FIGS. 6a-b are typical illustrative drawings of the vacuum thermal insulating material in which an interval of cuts of the core material of FIG. 1 are narrow.

As shown in FIG. 6, two sets of multiple organic fibrous assemblies 100 (hereinafter, referred to as an aggregated roll 200) are prepared, in which a separate roll 20 (refer to FIG. 5(a)) composed of an organic fibrous assembly 10 of width "X" being wound in a coil fashion is arranged in a width direction "I" (an axial direction of the roll) in four. Two sets of aggregated rolls 200 and 210 composed of separate rolls 20a to 20d and 21a to 21d respectively (a first aggregated roll 200 located at the back side and a second aggregated roil 210 located at the front side) are arranged in the longitudinal direction "II" (an orthogonal direction to the axial direction of the roil) to be wound by a winding frame 22 all together. (Refer to FIG. 5(c)) In this case, the first and second aggregated rolls 200 and 210 disposed in the longitudinal direction "II" are shifted to the width direction "I" to make positions of the joint sections 12 and 13 of the first and second multiple organic fibrous assemblies 100 and 110 be arranged to be shifted. (Refer to FIG. 5(d))

Thus, two sets of the organic fibrous assemblies 10 and 11 of the first and second aggregated rolls 200 and 210 are wound to the winding frame 22 all together to form the core material 1 shown in FIG. 4. Except a first winding section O, since layers having different joint sections 12 and 13 vertically are laminated alternatively, strength can be secured and a flat surface can be obtained.

In the above descriptions, although a case is shown where separate rolls 20a to 20d and 21a to 21d are arranged in the width direction "I" in four to configure the aggregated rolls 200 and 210, two, three, five, or more may be arranged. Although a case is shown where two sets of the aggregated rolls 200 and 210 are prepared and arranged in the longitudinal direction "II", three sets or more may be arranged.

The core material 1 formed like above is inserted info the outer packaging material 2 having a gas barrier property along with adsorbent 3 and sealed using a vacuum packing machine after being kept for a predetermined time under 2.0 Pa or less, for example, to form a vacuum thermal insulating material 5. In addition, although CaO that can absorb saturated wafer content of polyester organic fibrous assemblies 10 and 11, which is the core material 1, is used for the adsorbent 3, gas adsorbent such as synthesized zeolite may be used together.

In this case, when using inorganic fiber such as glass wool as fibrous assembly, winding processing is difficult using a roll for those subjected to no hinder processing. Even if subjected to the binder processing, manufacturing is difficult because fiber itself is so hard and brittle as to cause breakage, resulting in deterioration of work environment due to generation of powders and lowering of thermal insulating performance, therefore, the same methods cannot be employed.

Separate rolls 20a to 20d and 21a to 21d composed of organic fibrous assemblies 10a to 10d and 11a to 11d may be a fag end roll after the core materials of a desired size is cut out from the original fabric roll. Even an end section core material that used to be a loss can be used as it is without processing like remelting repellet when using the present method, therefore, there is no problem such as thermal degradation and materials can be effectively used. In addition, separate roils 20a to 20d and 21a to 21d composed of organic fibrous assemblies 10a to 10d and 11a to 11d may use those having a uniform size so that joint section intervals become stable.

The size in the width direction "I" of the vacuum thermal insulating material 5 can be adjusted by changing the numbers and sizes of the separate rolls 20a to 20d and 21a to 21d to be arranged. Further, the depth size (the size of an opening in the longitudinal direction "II") of the vacuum thermal insulating material 5 can be adjusted by changing the width of the winding frame 22. When preparing the core material 1 of the vacuum thermal insulating material 5 having a different size, no massive change in equipment and apparatuses is required.

In the joint sections 12 and 13 of the multiple organic fibrous assemblies 100 and 110 constituting the core material 1 of the vacuum thermal insulating material 5, a groove 14 is sometimes formed on the surface of the vacuum thermal insulating material 5 due to handling at the time of vacuum packing and shift at the time of decompression pack. In this case, since when the spacing between the joint sections 12 and 13 is specified to be as small as 10 mm or less, since wrap area between the joint portions of the upper and the lower layers becomes small, the friction force exerted along the width direction "I" becomes small. Therefore, bending becomes easy like the vacuum thermal insulating material 5 shown in FIG. 6(b) at the section of two adjacent grooves 14 to 10 mm or smaller, so that no unreasonable force is imposed to the packaging material at the bent portion, resulting in resistant to breakage. Thus, the vacuum thermal insulating material 5 can be disposed in a part which is not a plane such as a thermal insulating box, enabling to form a box having excellent thermal insulating performance.

Figure 7:
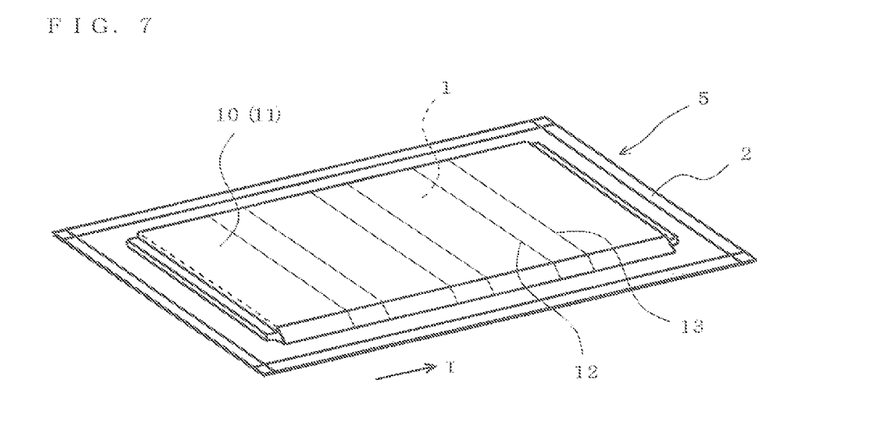
FIG. 7 is a typical illustrative drawing of the vacuum thermal insulating material in which the interval of cuts of the core material of FIG. 1 is broad.

When spacing between the joint sections 12 and 13 is set at as wide as 20 mm or over, since the wrap area between joint sections of the upper and lower layers becomes large, the friction force acting in the width direction "I" therebetween becomes large. Thereby, since handling at the time of vacuum packing and shift at the time of decompression pack become small, only a slight joint section appears on the surface of the vacuum thermal insulating material 5 as shown in FIG. 7 and an equal vacuum thermal insulating material 5 in strength can be obtained when compared with the vacuum thermal insulating material prepared by laminating sheet-shaped ones having no joint section.

Figure 8:
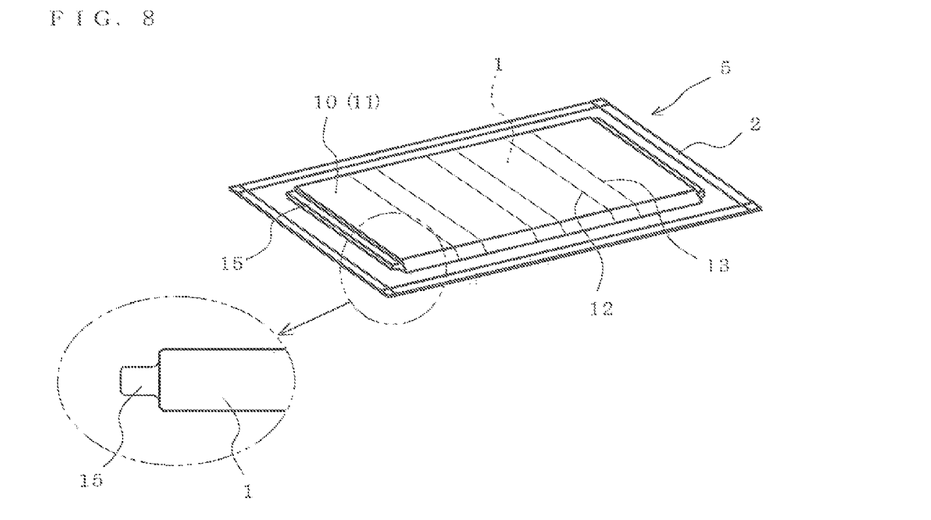
FIG. 8 is a main section side view showing lamination structure of the edge part of the core material of FIG. 4.

In Embodiment 1, when using separate roils 20a to 20d and 21a to 21d having the same size in the width direction "I" (refer to FIGS. 4 and 5), since a thin portion is created in the end section 15 of the core material 1 and becomes a bump-like whose thickness is almost half of that of the center section as shown in an enlarged view of FIG. 8, the end section 15 can be used as a standard and displacement prevention at the time of disposing.

Figure 9:
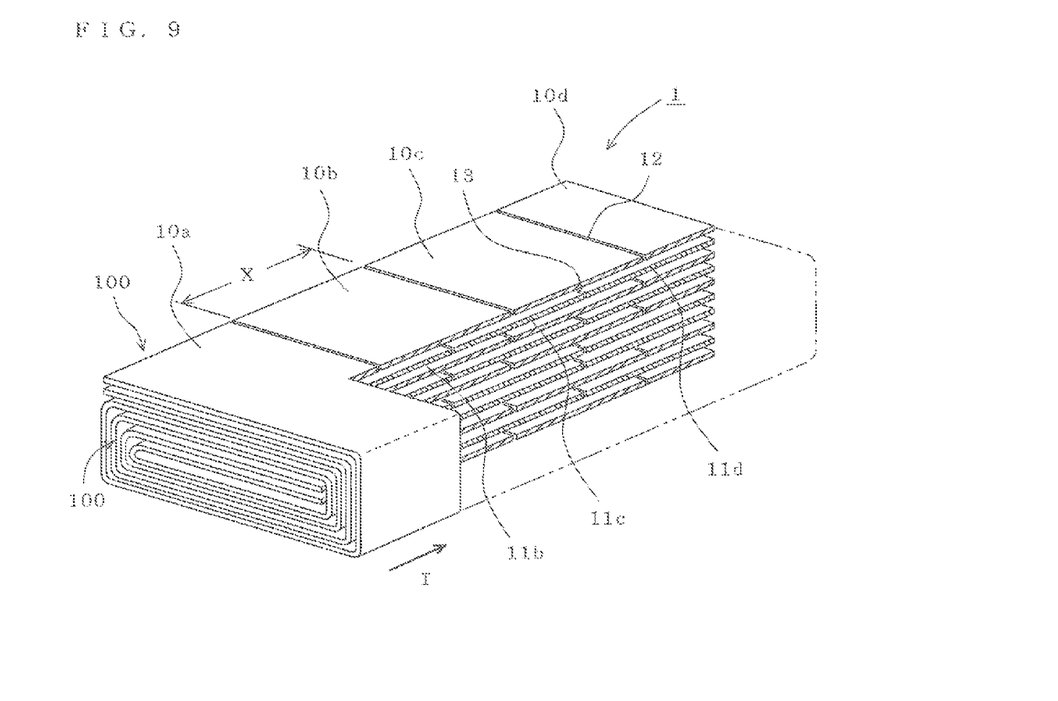
FIG. 9 is a perspective view of other example showing part of the core material of the vacuum thermal insulating material of FIG. 1 as a cross-section.

As shown in FIG. 9, unevenness can be canceled in such a way that the end section in the width direction "I" after winding the first multiple organic fibrous assembly 100 and the end section in the width direction "I" after winding the second multiple organic fibrous assembly 110 are arranged by making the width sizes of the organic fibrous assemblies 10a and 10d located at both ends of the width direction "I" of the first multiple organic fibrous assembly 100 different from the width size of the organic fibrous assemblies 10b and 10c located therebetween, specifically, by making the width size of the right-side organic fibrous assemblies 10d in the figure narrower than "X" and making the width size of the left-side organic fibrous assemblies 10a in the figure wider than "X", that is, by combining the separate rolls 20b and 20c whose width size is "X" with the separate roll 20d with narrower width and the separate roll 20a with wider width. In this case, as the width of the organic fibrous assemblies 10d of one end section side is narrowed, the width of the organic fibrous assemblies 10a of the other end section side is widened. In addition, in the above-mentioned case, all the width sizes of the organic fibrous assemblies 11a to 11d of the second multiple organic fibrous assembly 110 are equal as "X".

Thus, by adjusting the width of the separate rolls 20a to 20d and 21a to 21d, the vacuum thermal insulating material 5 having a size to meet with a request can be prepared. Further, the vacuum thermal insulating material 5 having excellent strength can be prepared even if not having the organic fibrous assemblies 10 and 11 with a uniform width X but the joint sections 12 and 13 are overlapped.

With the vacuum thermal insulating material 5 obtained as above, although the joint sections 12 and 13 of each band-shaped organic fibrous assemblies 10a to 10d and 11a to 11d appear somewhat linearly on a surface of the outer packaging material 2, there is no great difference in surface flatness compared with a vacuum thermal insulating material obtained by laminating organic fibrous assemblies according to the desired size of a vacuum thermal insulating material. The thermal insulating performance of the vacuum thermal insulating material 5 is evaluated using thermal conductivity. The thermal conductivity is measured using a thermal conductivity measuring instrument made by EKO INSTRUMENTS Co., LTD. Compared with thermal conductivity 2.26 mW/mK of the vacuum thermal insulating material obtained by laminating the organic fibrous assemblies according to the desired size of conventional vacuum thermal insulating material, an equivalent value 2.28 mW/mK is obtained.

According to Embodiment 1, the vacuum thermal insulating material 5 that is easily subjected to change in sizes and excellent in handling property, thermal insulating performance, and strength and a method of manufacturing the same can be obtained. Further, the end section to be a loss when an organic fibrous assembly having a desired size is cut out from an original fabric roll of the organic fibrous assembly can be used as it is as a product while performing no heat processing such as remelting re-pelletization, enabling energy-saving and effective utilization of resources. Since several sets in which separate rolls 20 are arranged in plural are wound up all together, productivity is excellent because of reduction in hours.

Embodiment 2

Vacuum Thermal Insulating Material

Figure 10:
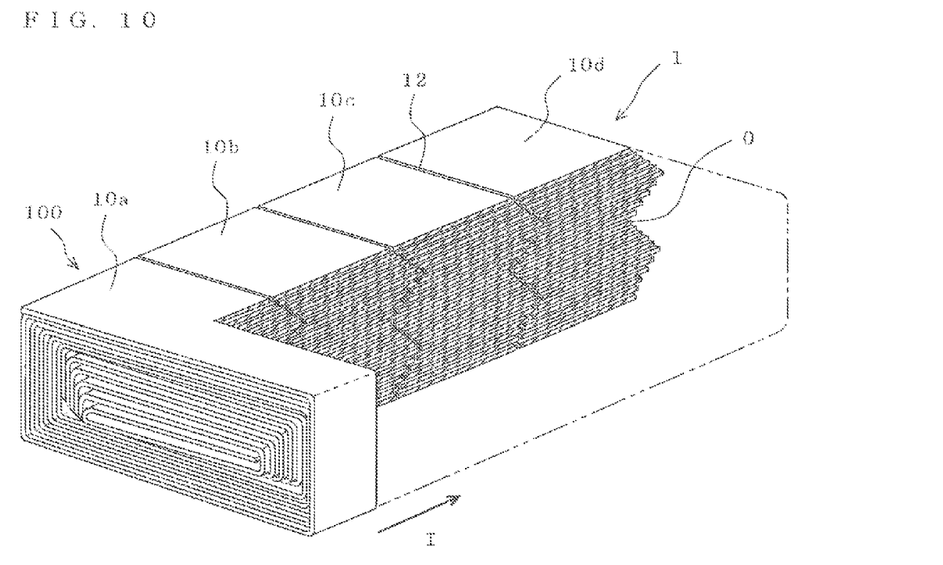
FIG. 10 is a perspective view showing part of the core material of the vacuum thermal insulating material according to Embodiment 2 of the present invention as a cross-section.

FIG. 10 is a perspective view showing the core material of a vacuum thermal insulating material according to Embodiment 2 of the present invention.

In Embodiment 1, two sheet-shaped organic fibrous assemblies 10 and 11 are wound from the inner circumference to the outer circumference in succession and laminated to form the core material 1. In Embodiment 2, one sheet-shaped organic fibrous assembly 10 is wound from the inner circumference to the outer circumference in succession and laminated with the winding frame being moved horizontally to form the core-material 1.

With the core material 1, separate rolls 20a to 20d made of sheet-shaped long fiber organic fibrous assemblies 10a to 10d of size "X" smaller than the size thereof in the width direction "I" are arranged in parallel in the width direction "I", for example, in four to form a sheet-shaped multiple organic fibrous assembly 100 and laminated in a roll fashion. Then, the joint section 12 of the organic fibrous assemblies 10a to 10d constituting the multiple organic fibrous assembly 100 is shifted in the width direction "I" so as not to be vertically overlapped. That is, the joint section 12 is laminated with being shifted at a certain spacing from the first winding up section (center portion) O to one end section side (right end section side of FIG. 10) in the vertical direction. Then, it is laminated with being shifted at the same spacing to the other end section side (left end section side of FIG. 10). These are repeated to form a dog leg shape.

Descriptions will be given to the method of manufacturing the vacuum thermal insulating material 5 configured as the above.

Figure 11:
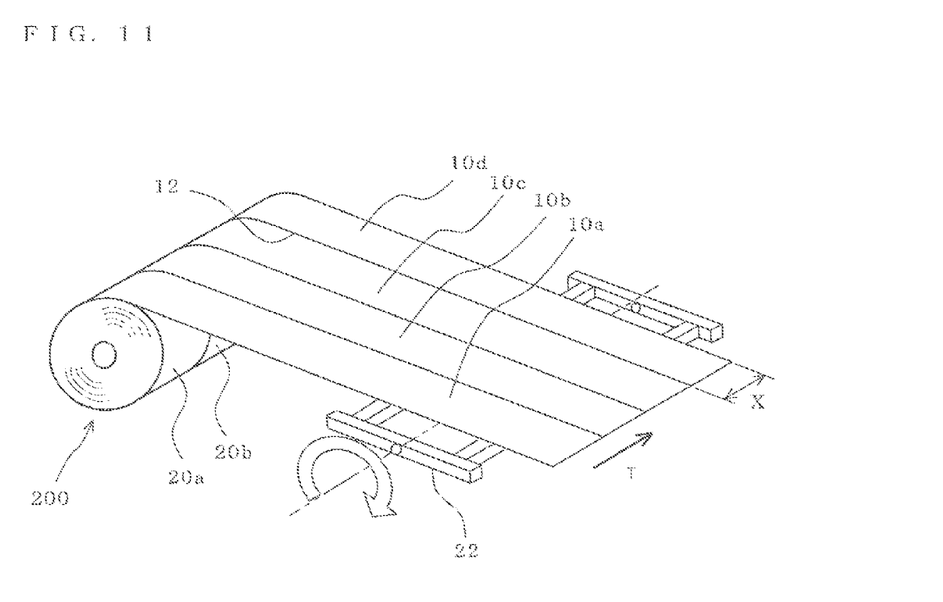
FIG. 11 is an illustrative drawing showing a method of manufacturing the core material of FIG. 10.

As shown in FIG. 11, separate roils 20a to 20d having width "X" arranged in the axial direction (width direction "I") in four, for example, are prepared as a set of an aggregated roll 200. Each separate roll 20a to 20d is composed of the organic fibrous assemblies 10a to 10d having the same width "X", and it is wound by a sliding winding frame 22 arranged almost in parallel with the width direction "I" of the aggregated roll 200. Then, in order that the joint section 12 of each organic fibrous assembly 10a to 10d does not overlap, the aggregated roll 200 is wound up with gradually shifting the sliding winding frame 22 in the width direction "I" for each turn. After winding a certain turns or a certain amount of length, the winding is returned and continued while being shifted in the reverse direction in the same way.

According to Embodiment 2, the core material 1 can be formed easily only using a set of the aggregated roll 20.

In Embodiment 2, the size of the vacuum thermal insulating material 5 can be freely adjusted by changing the number of the separate rolls 20a to 20d to be arranged and the width of the winding frame 22. The vacuum thermal insulating material 5 having excellent strength and thermal insulating performance can be obtained when shifting width for one revolution is around 5 mm and the reciprocation range is 30 mm.

According to Embodiment 2, the size of the core material 1 can be changed without changing the width of the separate roll 20 and a vacuum thermal insulating material 5 having excellent handling property, thermal insulating performance, and strength can be obtained. Further, the end section resulting in a loss when manufacturing organic fibrous assemblies can be used as it is as a product without processing such as remelting and re-pelletization, enabling energy-saving and effective utilization of resources. Since the organic fibrous assemblies 10a to 10d are wound up all together from plural (four, for example) separate roils 20a to 20d being arranged, manufacturing time is reduced and productivity can be improved.

Embodiment 3

Vacuum Thermal Insulating Material

Figure 12:
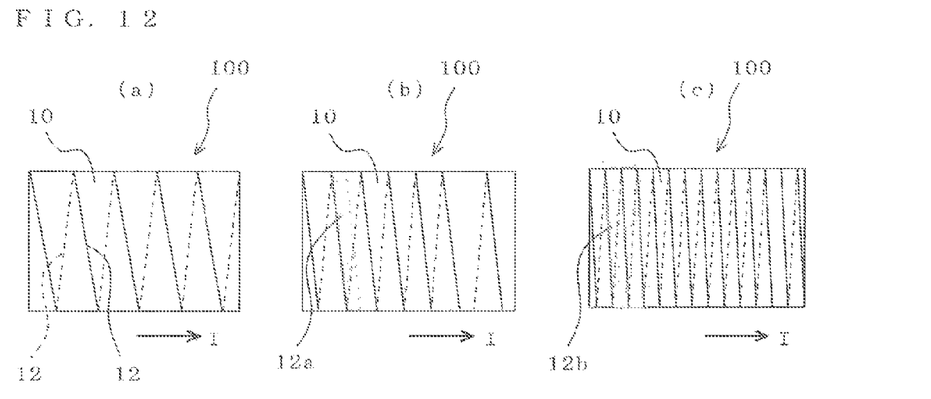
FIGS. 12a-c are illustrative drawings of the core material of the vacuum thermal insulating material according to Embodiment 3 of the present invention.

FIG. 12 is an illustrative drawing showing winding patterns of the core material 1 of the vacuum thermal insulating material 5 according to Embodiment 3 of the present invention.

In Embodiment 1, a case is shown where two sets of sheet-shaped organic fibrous assemblies 10 and 11 are wound up from the inner circumference to the outer circumference in succession and laminated to form the core material 1. In Embodiment 3, the organic fibrous assembly 10 composed of a single separate roll 20 is wound up with slanting for a certain degree against the wounding frame to form the core material 1.

The core material 1 is obtained by laminating vertically, sliding, and winding up a sheet-shaped organic fibrous assembly 10 of size "X" smaller than the size thereof in the width direction "I" on the winding roll 22. Then, the joint section 12 in front of and behind the organic fibrous assembly 10 is disposed in parallel while slanting to the width direction "I" and the joint section 12 of the vertically adjoining organic fibrous assembly 10 is disposed in parallel with slanting to the reverse direction.

In this case, a method of winding in which the adjoining organic fibrous assemblies 10 are not overlapped at the joint section 12 (refer to FIG. 12(a)), a method of winding in which only the length 12a that is one-third of the width size of the adjoining organic fibrous assemblies 10 for example, is overlapped (refer to FIG. 12(b)), and a method of winding in which only the length 12b that is two-thirds of the width size of the adjoining organic fibrous assemblies 10 for example, is overlapped (refer to FIG. 12(c)) are available.

Descriptions will be given to the method of manufacturing the vacuum thermal insulating material 5 configured as above.

Figure 13:
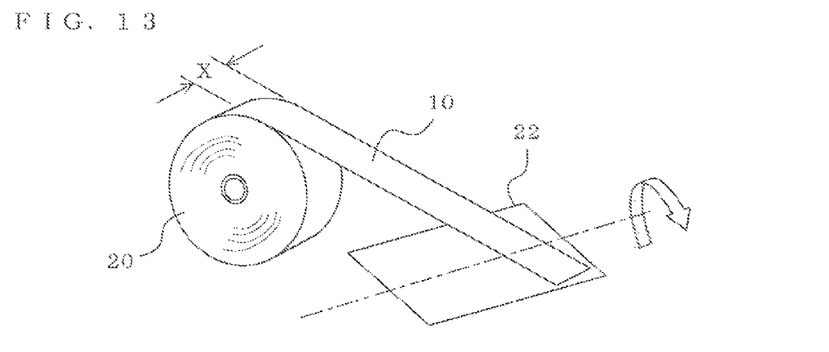
FIG. 13 is an illustrative drawing showing the method of manufacturing the core material of FIG. 12.
Figure 14:
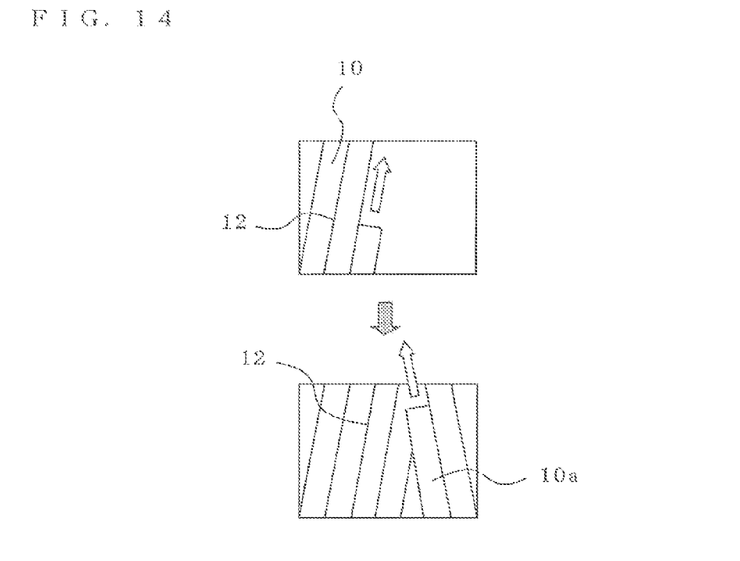
FIG. 14 is an illustrative drawing showing the method of manufacturing the core material of FIG. 12.

As shown in FIG. 13, only one separate roll 20 (single roll) having the organic fibrous assembly 10 of width "X" wound is prepared and it is wound up onto the sliding winding frame 22. Then, the separate roll 20 is wound while making its axial direction slanted for a certain angle against an axial direction of the winding frame 22. When the winding is completed for a width of a predetermined size, it is folded back and continued in the same way. As shown in FIG. 14, since the joint section 12 of the organic fibrous assembly 10 is covered with a further different slanting angle, the vacuum thermal insulating material 5 using the core material 1 obtained by the present method can secure sufficient strength. Thus, in Embodiment 3, using only one separate roll 20, the core material 1 having a desired size can be obtained. A required size of the vacuum thermal insulating material 5 can be adjusted by the width of the winding frame 22 and the width and number of turns of winding.

According to Embodiment 3, it is possible to correspond to an arbitrary size of the vacuum thermal insulating material 5 using the separate roll 20 having a constant width and to obtain the vacuum thermal insulating material 5 having excellent handling property, thermal insulating performance, and strength. Further, the end section resulting in a loss when producing the organic fibrous assembly can be used as it is as a product, enabling energy-saving and effective utilization of resources.

Embodiment 4

Thermal Insulating Box

Figure 15:
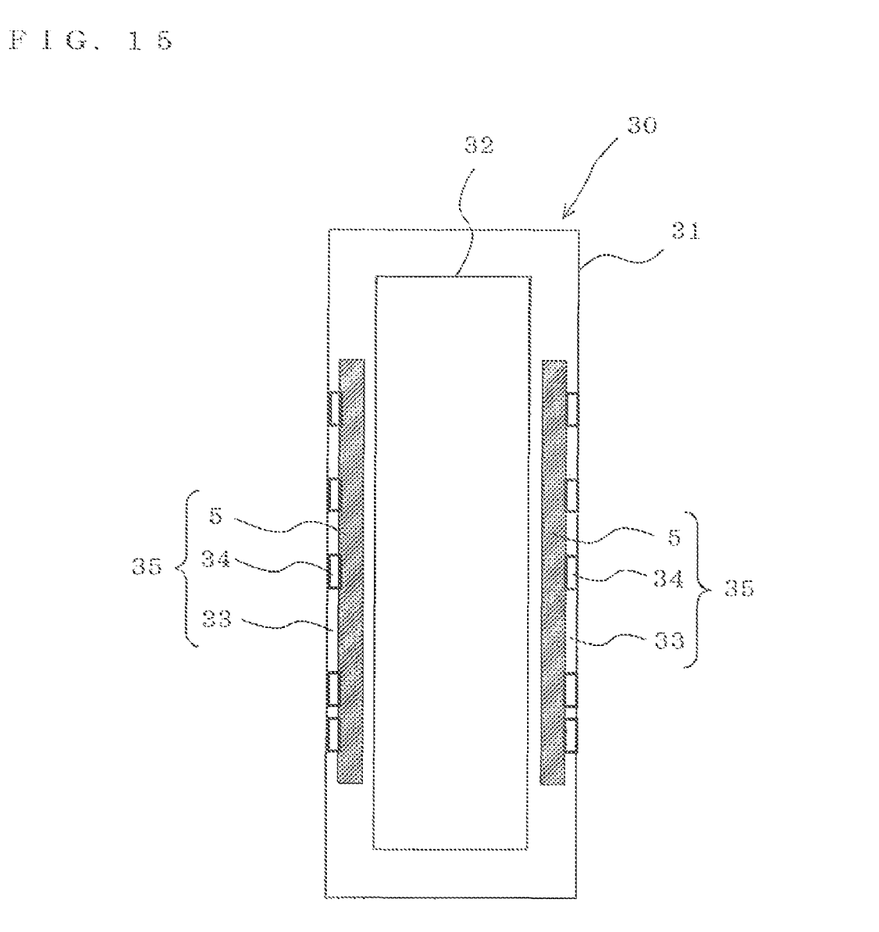
FIG. 15 is a cross-section view typically showing a thermal insulating box according to Embodiment 4 of the present invention.

FIG. 15 is a cross-section view of a thermal insulating box (refers to a refrigerator in the present Embodiment) according to Embodiment 4 of the present invention.

In FIG. 15, a refrigerator 30, which is a thermal insulating box, has an outer box 31, an inner box 32 disposed inside the outer box 31, a vacuum thermal insulating material 5 and polyurethane foam (a thermal insulating material) 33 disposed between the outer box 31 and inner box 32, and a refrigeration unit (not shown) that supplies cooling energy inside the inner box 32. In addition, in the outer box 31 and inner box 32, an opening (not shown) is formed on a common face, respectively, and an opening/closing door (not shown) is provided with the opening.

With the refrigerator above, since the outer packaging material 2 of the vacuum thermal insulating material 5 contains aluminum foil (refer to FIG. 1), it remains possible that a heat bridge occurs, in which heat goes around through the aluminum foil. Accordingly, in order to suppress the influence of the heat bridge, the vacuum thermal insulating material 5 is disposed away from a coated steel plate of the outer box 31 using spacer 34, which is a resin molding product. In the spacer 34, holes that avoid disturbances of flow are suitably provided such that no voids remain in the polyurethane foam injected into a thermal insulating wall in the post process.

That is, the refrigerator 30 has the thermal insulating wall 35 formed by the vacuum thermal insulating material 5, spacer 34, and polyurethane foam 33. In addition, a range where the thermal insulating wall 35 is disposed is not limited but may be all the range of the space formed between the outer box 31 and inner box 32, or may be part thereof. It may be disposed inside of the opening/closing door as well.

When in out of use, the refrigerator 30 configured above is taken apart and recycled in recycling centers in various places based on Home Appliance Recycling Law.

In a case where the core material of the vacuum thermal insulating material of the refrigerator is inorganic powder as before, powders are scattered so that it is not possible to perform crushing operation as a box. Accordingly, it takes much time to take out the vacuum thermal insulating material out of the refrigerator box.

Alternatively, in a case where the core material of the vacuum thermal insulating material of the refrigerator is glass fiber as before, it is possible to perform crushing operation as a box. Although, the crushed glass fiber is subjected to thermal recycling mixed with ground products of the polyurethane foam, there are difficulties in recycling property such that combustion efficiency is lowered and residues remain.

In contrast, since the refrigerator 30 according to the present invention has the vacuum thermal insulating material 5 in which the core material 1 formed by the fibrous assemblies (organic fibrous assemblies 10 and 11) is disposed, it is possible to perform crushing operation without taking out the vacuum thermal insulating material 5. Therefore, at the time of thermal recycling, neither combustion efficiency is lowered nor residues remain, resulting in excellent recycling property.

Although in the above descriptions, a case is shown where the thermal insulating box is the refrigerator 30, the present invention is not limited thereto. Instead of cold equipment or heating equipment such as thermal insulating storage, a vehicle air-conditioner, water heater, and a box with a predetermined shape, a thermal insulating bag (a thermal insulating container) having a freely flexure-deformed outer bag and inner bag are allowable.

Then, the thermal insulating box may implement temperature adjustment means to regulate the temperature of inside of the inner box.

REFERENCE SIGNS LIST 1 core material
2 outer packaging material (gas barrier container)
5 vacuum thermal insulating material 10, 11 organic fibrous assembly
12, 13 joint section
20a to 20d, 21a to 21d separate roll
22 winding frame
31 outer box
32 inner box
33 polyurethane foam (thermal insulating material)
34 spacer
100, 110 multiple organic fibrous assembly
200, 210 aggregated roll

The invention claimed is:

1. A vacuum thermal insulating material that has a core material enclosed in a gas barrier container whose inside is made to be a decompression state, wherein
said core material is made to be a laminated structure in which a sheet-shaped fibrous assembly is continuously wound from an inner periphery to an outer periphery, and
said core material is formed by a sheet-shaped multiple fibrous assembly which has a plurality of sheet-shaped fibrous assemblies arranged in parallel and which has joint sections.

2. The vacuum thermal insulating material of claim 1, wherein
said core material is made to be a laminated structure having a plurality of sheet-shaped fibrous assemblies continuously wound from an inner periphery to an outer periphery.

3. The vacuum thermal insulating material of claim 1, wherein
said core material is made to be a laminated structure having a sheet of sheet-shaped fibrous assembly continuously wound from an inner periphery to an outer periphery.

4. The vacuum thermal insulating material of claim 1, wherein
the joint sections of said sheet-shaped multiple fibrous assembly are made not to overlap with joint sections of upper and lower sheet-shaped multiple fibrous assembly.

5. The vacuum thermal insulating material of claim 1, wherein
said sheet-shaped multiple fibrous assembly is made of sheet-shaped fibrous assemblies having the same width.

6. The vacuum thermal insulating material of claim 1, wherein
said sheet-shaped multiple fibrous assembly is made of sheet-shaped fibrous assemblies whose widths are two kinds or more and whose end positions in a width direction of said core material are lined up.

7. The vacuum thermal insulating material of claim 1, wherein
said sheet-shaped fibrous assembly is a sheet-shaped long fiber of an organic fibrous assembly or an organic unwoven cloth.

8. The vacuum thermal insulating material of claim 1, wherein the gas barrier container has a planar shape.

9. A thermal insulating box, comprising:
an outer box and an inner box disposed inside of said outer box;
and a vacuum thermal insulating material that has a core material enclosed in a gas barrier container whose inside is made to be a decompression state is disposed between said outer box and inner box, wherein said core material is made to be a laminated structure in which a sheet-shaped fibrous assembly is continuously wound from an inner periphery to an outer periphery.

10. The thermal insulating box of claim 9, wherein
the thermal insulating material is filled both between said outer box and said vacuum thermal insulating material and between said inner box and said vacuum thermal insulating material, or either thereof.

11. The thermal insulating box of claim 9, wherein
a spacer is disposed between said outer box and said vacuum thermal insulating material.

12. The thermal insulating box of claim 9, wherein
internal temperature of said inner box is adjusted by temperature adjustment means.

* * * * *